Feb. 28, 1950 E. S. HALL 2,498,679
STARPLATE MECHANISM
Filed July 12, 1948 2 Sheets-Sheet 1
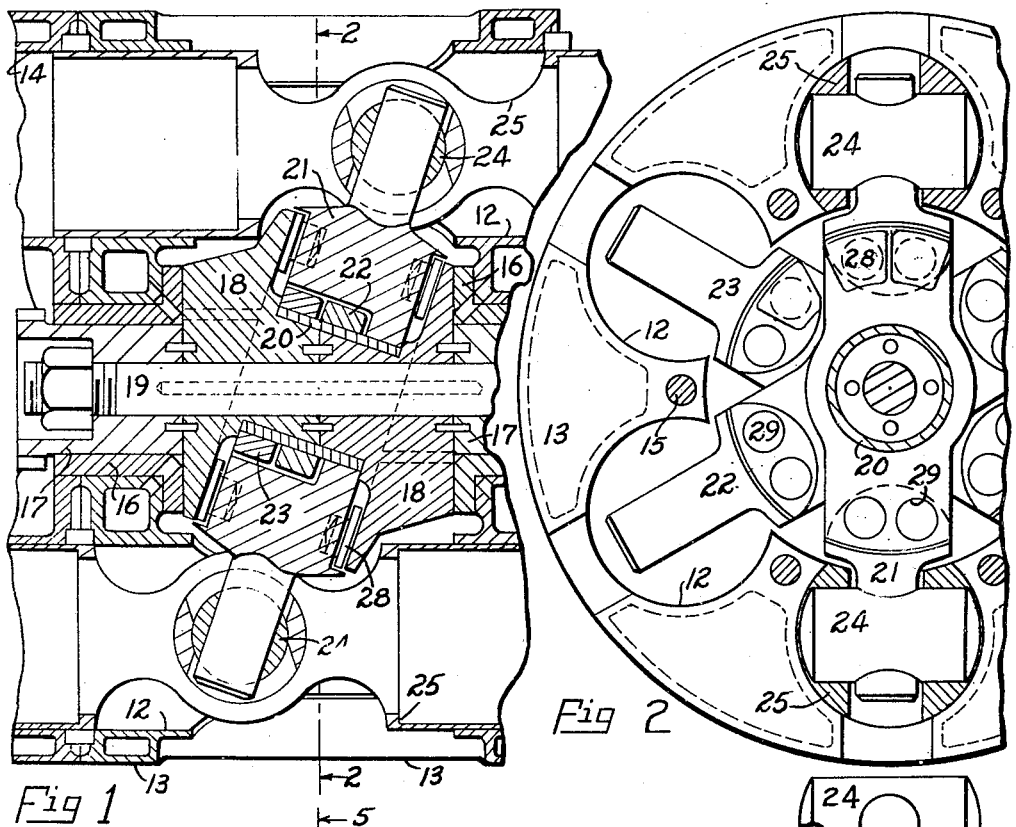
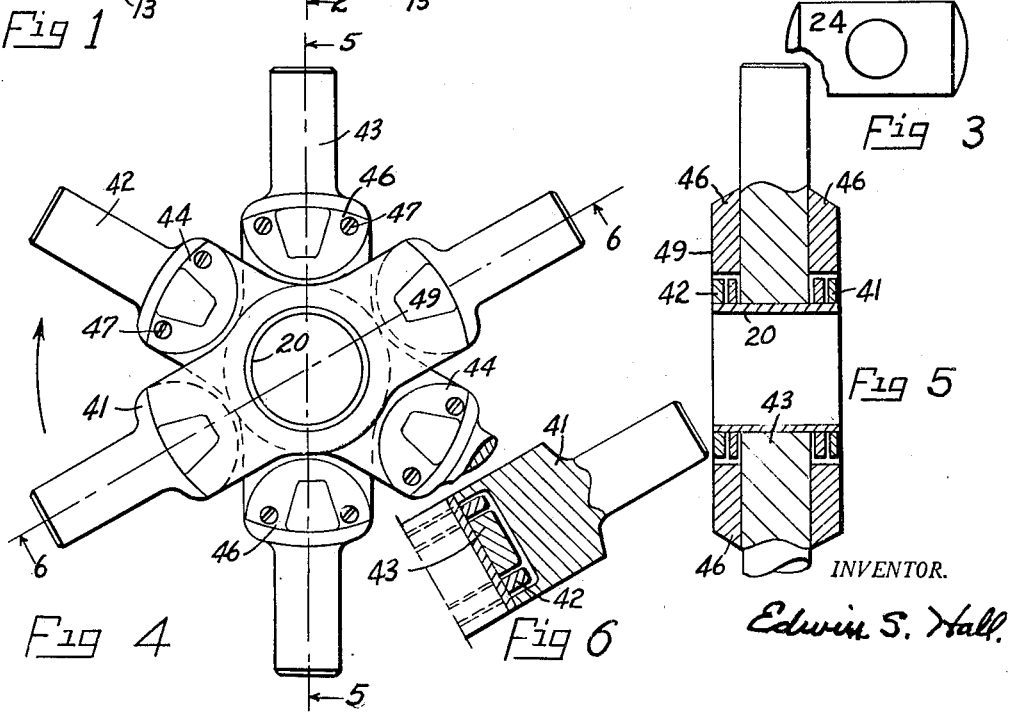
INVENTOR.
Edwin S. Hall INVENTOR.
Edwin S. Hall Patented Feb. 28, 1950

2,498,679

UNITED STATES PATENT OFFICE 2,498,679

STARPLATE MECHANISM

Edwin S. Hall, Farmington, Conn.

Application July 12, 1948, Serial No. 38,224

10 Claims. (Cl. 74—60)

This invention relates to starplate mechanisms for use in the interconversion of reciprocation and rotation in engines, pumps, and compressors of the class having cylinders parallel to the shaft, the cylinder axes spaced about the cylinder circle whose center is on the shaft axis—the class commonly called barrel type, axial, or round engine mechanisms. The objects of this invention is to provide an improved starplate mechanism.

In discussing such mechanisms, confusion may be avoided by defining a few terms. Reciprocating members, comprising either pistons or cylinders with or without crossheads, may be conveniently called "recipers." A plate member or structure mounted on bearings on and inclined to the shaft, and having arms operably connected to the recipers, may be called a "starplate." A plate member inclined to and rotating with the shaft is called a "slant." Usually the starplate is operable between two slants and the starplate bearings may include journal bearings and slipper thrust bearings, the slippers pivoted on the starplate and operable with film lubrication upon the slant surfaces. Alternately, the starplate may be built up with a U-section surrounding a single disc-like slant, with or without slipper bearings.

This invention is concerned with the simplest starplate mechanism, the one having starplate arms as radial pins, each operable within a hole diametrically thru a wristpin operably carried by one of the recipers, the axis of the wristpin being tangent to the cylinder circle.

Difficulties with starplate mechanisms include the problems which arise from the three-dimensional nature of the structure. Correct starplate motion is ordinarily lemniscatic, difficult to control properly. The three-dimensional movement is usually imposed also upon the recipers; their small rotational oscillation at twice shaft speed can produce inertia forces high enough to be destructive. An object of this invention is to provide a starplate mechanism symmetrical in motion and loadings relative to the several recipers, and capable of simple harmonic motion of the recipers with uniform shaft rotation, with no reciper rotation.

Other objects of this invention are to provide:

A starplate mechanism in which the several operable connections between the starplate and the recipers may be identical and similarly loaded;

A starplate mechanism in which the torque reaction is properly and uniformly distributed among the several recipers;

A starplate mechanism in which the torque reaction may be taken directly in the contact between the ends of the wristpins and the crosshead guides;

A starplate mechanism in which the torque reaction may be taken by slippers pivoted in the ends of the wristpins and operable with film lubrication within the crosshead guides;

A starplate mechanism having a compound starplate, each portion operable independently with its own bearings, which may or may not be pivoted slipper bearings riding with film lubrication upon the slant surfaces;

A compound starplate for a barrel engine having an even number of cylinder bores, the starplate comprising a plurality of members each having two diametrically opposite arms solidly connected, the axis of each member always in the plane of the two opposite cylinder axes, and each member independently operable on bearings inclined to the shaft axis;

A starplate mechanism free from high loadings between parts having small relative motions which reverse under load and are difficult to lubricate;

A starplate mechanism in which all bending and bearing loadings may be reasonable, and which may operate freely and with dynamic balance;

A starplate mechanism of easy manufacture and assembly.

Briefly described, the invention consists primarily of a starplate mechanism having an even number of recipers operable with simple harmonic motion in an even number of cylinder bores parallel to the shaft axis, the recipers operably connected to the shaft by a compound starplate having half as many members as the number of recipers, each starplate member serving two diametrically opposite recipers and operating independently from the other starplate members.

These and other features and objects of the invention may be understood from the following description, in connection with the drawings, in which Fig. 1 is a longitudinal section of a starplate mechanism;

Fig. 2 is a transverse section on the line 2—2 of Fig. 1, the starplate being shown in plan view, not sectioned, and as tho positioned normal to the shaft axis; only two of the six recipers are shown;

Fig. 3 is a view of the wristpin, taken radially relative to Fig. 2;

Fig. 4 is a plan view of a modified starplate structure;

Fig. 5 is a sectional view taken on the line 5—5 of Fig. 4;

Fig. 6 is a sectional view taken on the line 6—6 of Fig. 4;

Figure 7:
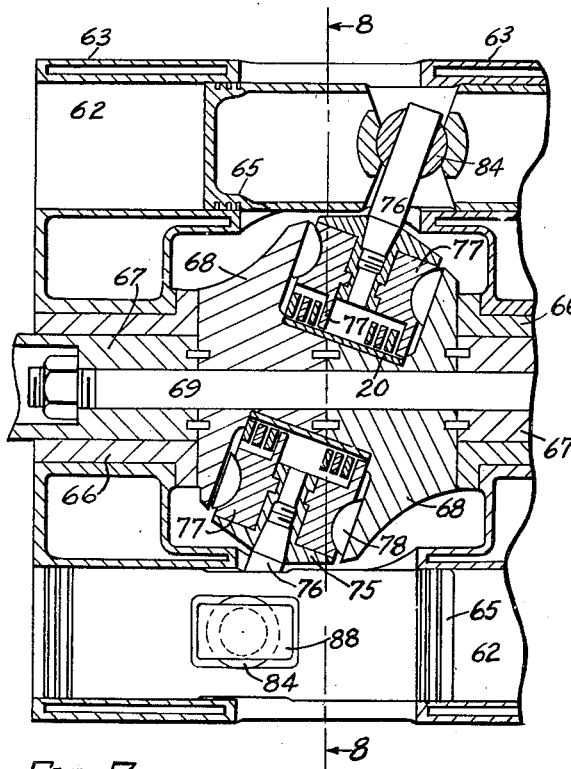
Fig. 7 is a longitudinal section of another modification.

Referring to Figs. 1, 2, and 3 of the drawings, cylindrical crosshead guides 12 are formed in a pair of frame members 13, which, together with a pair of cylinder blocks 14, are held together by thru-bolts 15. Flanged main bearings 16 are supported in frame members 13.

Main bearings 16 operably support the rotating shaft assembly comprising journals 17 and slants 18, dowelled together as shown, and held together by thru-bolt 19.

Slants 18 have inclined plane faces and an inclined journal upon which bushing 20 is operable. Operable upon bushing 20 are three starplate members 21, 22, and 23, each starplate member having two diametrically opposite arms formed as coaxial pins, operaly engaging a pair of wristpins 24 operably supported in a pair of recipers 25 which are free to reciprocate in crosshead guides 12.

Wristpins 24 may have spherical ends as shown in Figs. 2 and 3, operably fitting and running within cylindrical crosshead guides 12, transferring the torque reaction of the mechanism to the crosshead guides thru a lubricated and ever-changing line contact.

Slippers 28 are pivoted in counterbores 29 in starplate members 21, 22, and 23, and are operable with fluid film lubrication upon the inclined faces of slants 18. Each of the starplate members 21, 22, and 23, has its own set of slippers, and is independent of the other two starplate members as it serves to interconnect its two opposite recipers 25 with the rotating shaft assembly.

In operation, constant speed rotation of the rotating assembly comprising journals 17, slants 18, and bolt 19, is accompanied by harmonic reciprocation of recipers 25 in crosshead guides 12. Each of the starplate members is maintained with its axis in the plane of the axes of the two recipers it serves. There is no reciper rotation. The inertia couple of the rocking starplate members add directly to the inertia couple of the recipers; the total couple, of constant magnitude, can be balanced by a suitable centrifugal couple in the rotating assembly, in well-known manner.

In the embodiment of Figs. 1 and 2, the three starplate members are of two kinds. Member 22 is symmetrical; the ring which connects its two arms is in its mid-plane. Members 21 and 23 are identical, but they face in opposite directions; their ring portions are offset relative to the plane of the arm axis.

In the embodiment of Figs. 4, 5, and 6, each of the three starplate members 41, 42, and 43, is symmetrical but slightly different in structure from the other two. The side plates or ring portions of member 41 are spaced apart more than the ring portions of member 42. And the ring portion of member 43 is solid and central, slightly thicker than the diameter of the arm pins. Pads 44 are added to member 42, and pads 46 are added to member 43, to bring their respective slipper_faces 49 into the same plane with the slipper faces 49 of member 41. Pads 44 and 46 are held in place by screws 47. In assembling, member 42 (without its pads 44) is passed thru member 41, and then member 43 (without its pads 46) is passed thru both members 41 and 42. Then the common bushing 20 is inserted in all three members 41, 42, and 43. Then pads 44 and 46 are fastened to members 42 and 43 respectively by screws 47.

The three starplate members, 41, 42, and 43, while they ride on a common bushing 20, have no contact with each other during operation of the mechanism. The flat faces of member 41, and of pads 44 and 46 of members 42 and 43 respectively, may ride directly upon the adjacent slant faces of slants 18 (Fig. 1) and in so doing will form oil wedges by pivoting the starplate members bodily about their respective axes, the running clearances upon bushing 20 being sufficient to permit this slight pivoting. To assist in the oil wedge formation, the flat faces of members 41, 42, and 43 may be plated with a few thousandths of bearing metal only on segmental areas 49 offset as shown in Fig. 4 for slant rotation as indicated by the arrow.

Figure 8:
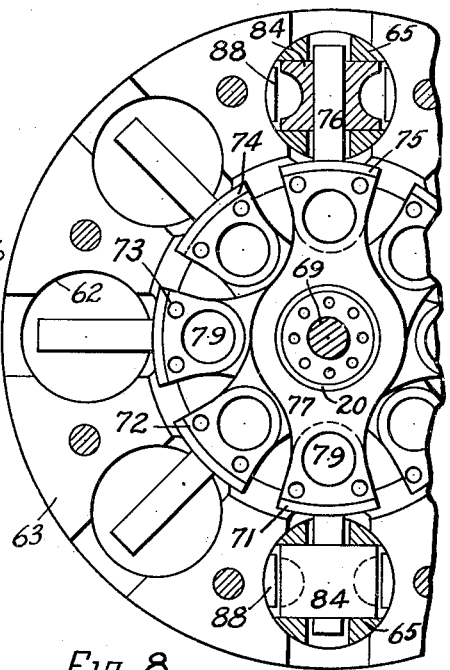
Fig. 8 is a transverse section taken on the line 8—8 of Fig. 7, the starplate being shown in plan view, not sectioned, and as tho it were positioned normal to the shaft axis; only two of the eight recipers are shown.

In the embodiment of Figs. 7 and 8, cylinders 62 in cylinder blocks 63 operably receive the double-ended piston members 65. Flanged main bearings 66 are supported in cylinder blocks 63 and operably support the rotating shaft assembly comprising journals 67 and slants 68, dowelled together, and held together by thru-bolt 69.

Slants 68 have inclined plane faces and an inclined journal upon which bushing 20 is operable.

Operable upon bushing 20 are four starplate members 71, 72, 73, and 74, each built up of a pair of sectors to which are bolted a pair of connecting plate or ring portions, and into which are removably secured the two arm pins. For example, starplate member 71 is built up of a pair of sectors 75 into which are screwed arm pins 76, and to which are bolted plates 77, further secured by tongue-and-groove. The central portion of each plate 77 is formed as a ring to ride upon bushing 20, and the end portions contain the sockets 79 for slippers 78. The slipper form illustrated is the round type, underslung (i. e. having the spherical center below the slant surface), comprising approximately one-fourth of a sphere. Each of the members 71, 72, and 73 is shown with a total of four slippers; more could be provided, or less, as desired.

Starplate arm pins 76 operably engage the holes thru wristpins 84 operably carried by piston members 65. Slippers 88 are spherically pivoted in the ends of wristpins 84, to coact with film lubrication on cylinders 62, to carry the torque reaction of the mechanism.

Each starplate member is independent of the others in transmitting the loads between its respective piston members and slants 68. The eight member plates are of four different details, the two of a kind being assembled on different starplate members and facing in opposite directions. The plates are all carried on bushing 20, but need have no contact with each other. Operation is the same as that described for the embodiment of Figs. 1, 2, and 3.

Figure 9:
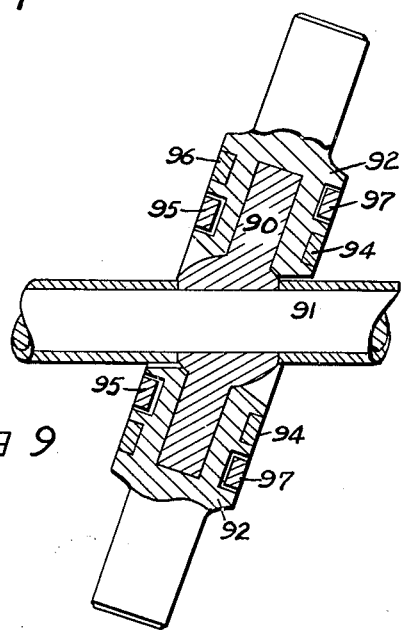
Fig. 9 is a longitudinal section of the other inversion of the starplate structure.
Figure 10:
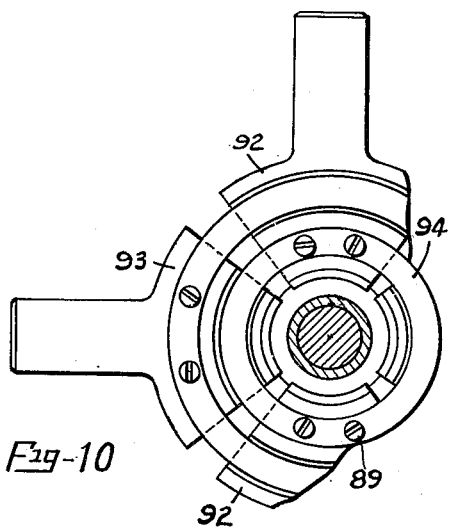
Fig. 10 is a plan view of the starplate of Fig. 9.

In Figs. 9 and 10 is shown the other inversion of the starplate mechanism. Disc-like slant 90 is fixed on shaft 91. Starplate sectors, in two pairs, 92 and 93, are of U-section operably fitting slant 90. Sectors 92 are fastened together by rings 94 and 96 pressed into grooves in the sectors and secured by screws 89. Sectors 93 are fastened together by rings 95 and 97 pressed into grooves in the sectors and secured by screws 89. Rings 94 and 96 have clearance relative to sectors 93; rings 95 and 97 have clearance relative to sectors 92.

Thus each pair of diametrically opposite starplate arms are solidly connected and independently carried on slant 90. Each starplate member 92 or 93, as an assembly, will pivot slightly, in operation, about its axis as the oil wedges form between the inner flat faces of sectors 92 and 93 and the flat faces of slant 90. If it were not for the presence of this wedge-film lubrication, with each starplate member acting like a pivoted slipper, the structure of Figs. 9 and 10 would be impractical, for it is well-known that a collar thrust bearing, in which no pivoting is possible, will not carry much load.

Having thus described the invention, it is obvious that the objects, as stated, have been attained. While specific embodiments have been shown and described, it is understood that changes may be made in the construction and arrangement of the mechanism without departing from the spirit or scope of the following claims.

I claim:

1. In a starplate mechanism having a main shaft axis and an even number of cylinder bores parallel thereto, a compound starplate having half as many members as the number of cylinder bores, each of said members serving two diametrically opposite cylinder bores.

2. In a starplate mechanism, a rotating shaft assembly including slants having bearing surfaces inclined to the axis of rotation, an even number of cylinder bores parallel to said axis, recipers operable in said bores, and a compound starplate having half as many members as the number of said recipers, each of said members operably connecting two diametrically opposite recipers to said rotating shaft assembly.

3. In a starplate mechanism, a rotating shaft assembly including slants having plane bearing faces inclined to the axis of rotation, an even number of cylinder bores parallel to said axis, recipers operable in said bores, a compound starplate having half as many members as the number of said recipers, slippers operably pivoted in each of said members and coacting with said inclined plane faces with film lubrication, each of said members operably connecting two diametrically opposite recipers, thru its own slippers, to said rotating shaft assembly.

4. In a starplate mechanism, a rotating shaft assembly including bearings inclined to the axis of rotation, cylindrical crosshead guides parallel to said axis, recipers operable in said guides, a starplate structure operably connecting said recipers with said rotating assembly, starplate arms formed as radiating pins, wristpins operably carried by said recipers and having diametrical holes operably engaging said pins, the ends of said wristpins being spherical and operably fitting within said crosshead guides.

5. In a starplate mechanism, a rotating shaft assembly including bearings inclined to the axis of rotation, cylindrical crosshead guides parallel to said axis, recipers operable in said guides, a starplate structure operably connecting said recipers with said rotating assembly, starplate arms formed as radiating pins, wristpins operably carried by said recipers and having diametrical holes operably engaging said pins, and slippers pivoted in the ends of said wristpins and coacting with film lubrication within said crosshead guides.

6. A starplate mechanism comprising a rotating shaft assembly including slants having plane bearing faces inclined to the axis of rotation, an even number of cylindrical crosshead guides parallel to said axis, recipers operable in said guides, a compound starplate having half as many members as the number of said cylindrical crosshead guides, slippers pivoted in each of said members and coacting with said plane bearing faces, each of said members having a pair of coaxial and diametrically opposite arm pins, wristpins carried by said recipers and operably engaging said arm pins, and slippers spherically pivoted in the ends of said wristpins and coacting with said crosshead guides, each of said starplate members serving, independently of the other said members, to transfer the torque reaction from the rotating assembly thru both sets of slippers to said cylindrical crosshead guides.

7. In a starplate mechanism, a rotating shaft assembly including journal and thrust bearing surfaces inclined to the axis of rotation, cylinders parallel to said axis of rotation, recipers operable in said cylinders, wristpins operably rockable in said reciprocating members without appreciable axial freedom, a hole diametrically thru the center of each said wristpin, and a starplate structure having half as many members as the number of recipers, each said member having two starplate arms formed as pins coaxial and engaging said diametrical holes in two of said wristpins in diametrically opposite recipers, the axis of said arm pins remaining in the plane of the axes of said diametrically opposite recipers, insuring that the reciper motion is simple harmonic without rotation about its own axis.

8. A starplate mechanism comprising a rotating shaft assembly including bearing surfaces inclined to the axis of rotation, cylinders parallel to said axis of rotation, recipers operable in said cylinders, a starplate structure coacting with said inclined bearing surfaces and comprising half as many members as the number of said recipers, each of said members having a pair of starplate arms operably connecting said starplate structure with a pair of diametrically opposite recipers.

9. A starplate mechanism comprising a rotating shaft assembly including journal and thrust bearing surfaces inclined to the axis of rotation, cylinders parallel to said axis, recipers operable in said cylinders, wristpins rockable in said recipers without appreciable axial freedom, a compound starplate, starplate arms operably connecting said starplate with said wristpins and engaging said journal and thrust bearing surfaces directly with wedge-film lubrication.

10. In a starplate mechanism, a rotating shaft assembly including a journal and a pair of slant surfaces inclined to the axis of rotation, cylinders parallel to said axis, recipers operable in said cylinders, wristpins rockable in said recipers without appreciable axial freedom, a compound starplate having half as many members as the number of recipers, each of said members having two arms on a common axis diametrical to said mechanism, each member operably connecting two opposite recipers with said rotating assembly, flat bearing faces on each said member adjacent said slant surfaces, each said member pivoting upon its own axis to form wedge-film lubrication with the adjacent slant surfaces.

EDWIN S. HALL.

REFERENCES CITED

The following references are of record in the file of this patent:

UNITED STATES PATENTS

| Number | Name | Date |
|---|---|---|
| 1,732,659 | Redrup | Oct. 22, 1929 |
| 1,842,322 | Hulsebos | Jan. 19, 1932 |
| 2,077,986 | Cassani | Apr. 20, 1937 |
| 2,335,415 | Holmes | Nov. 30, 1943 |

FOREIGN PATENTS

| Number | Country | Date |
|---|---|---|
| 517,625 | Great Britain | Feb. 5, 1940 |